United States Patent

Keinert et al.

[11] Patent Number: 5,871,033
[45] Date of Patent: Feb. 16, 1999

[54] SUCTION PIPE FOR THE COMBUSTION AIR OF A HEATER

[75] Inventors: Helmut Keinert, Nürtingen; Adolf Schodt, Esslingen, both of Germany

[73] Assignee: J. Eberspächer GMBH & Co., Esslingen, Germany

[21] Appl. No.: 875,981
[22] PCT Filed: Jul. 2, 1996
[86] PCT No.: PCT/DE96/01224
  § 371 Date: Aug. 19, 1997
  § 102(e) Date: Aug. 19, 1997
[87] PCT Pub. No.: WO97/04975
  PCT Pub. Date: Feb. 13, 1997

[30] Foreign Application Priority Data

Jul. 26, 1995 [DE] Germany ................ 195 27 269.2

[51] Int. Cl.⁶ ............................................ F15D 55/00
[52] U.S. Cl. ............................. 138/43; 237/12.3 C
[58] Field of Search ........................... 454/158, 159; 138/43; 237/12.3 C

[56] References Cited

U.S. PATENT DOCUMENTS 2,346,966 4/1944 Heymann.
4,144,016 3/1979 Takahashi et al. ................ 431/8
4,754,600 7/1988 Barbier et al. ................. 60/39.23

FOREIGN PATENT DOCUMENTS

| 0 239 462 | 9/1987 | European Pat. Off. . |
| 0 433 862 | 6/1991 | European Pat. Off. . |
| 2 193 468 | 2/1974 | France . |
| 2 341 099 | 9/1977 | France . |
| 2 668 817 | 5/1992 | France . |

Primary Examiner—Henry Bennett
Assistant Examiner—Derek S. Boles
Attorney, Agent, or Firm—McGlew and Tuttle

[57] ABSTRACT

A suction for the combustion air of a heater, in particular a motor vehicle heater, has a variable cross-section of flow. The object of the invention is to improve the operation of the device that modifies the cross-section of flow and to allow it to be more rationally produced. In addition, it should allow the suction air to be filtered in association with said means without extending the axial length of the heater. For that purpose, the suction pipe is designed as an axially closed tube with radial openings whose cross-sections may be changed by a coaxial, rotary ring set on the outside of the pipe and provided with radial openings. A hood may be axially drawn over the ring on the housing of the heater. Suction air may be filtered in said hood, either by centrifugaton in spiral channels arranged in the hood or by using a ring-shaped filter through which the suction air flows in the radial direction.

18 Claims, 1 Drawing Sheet

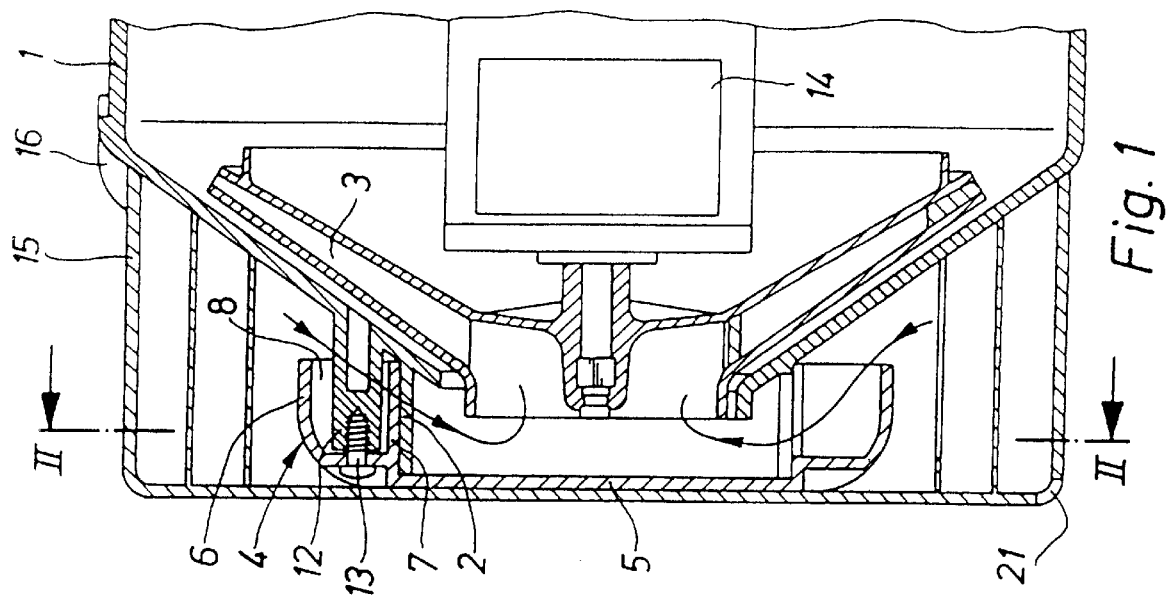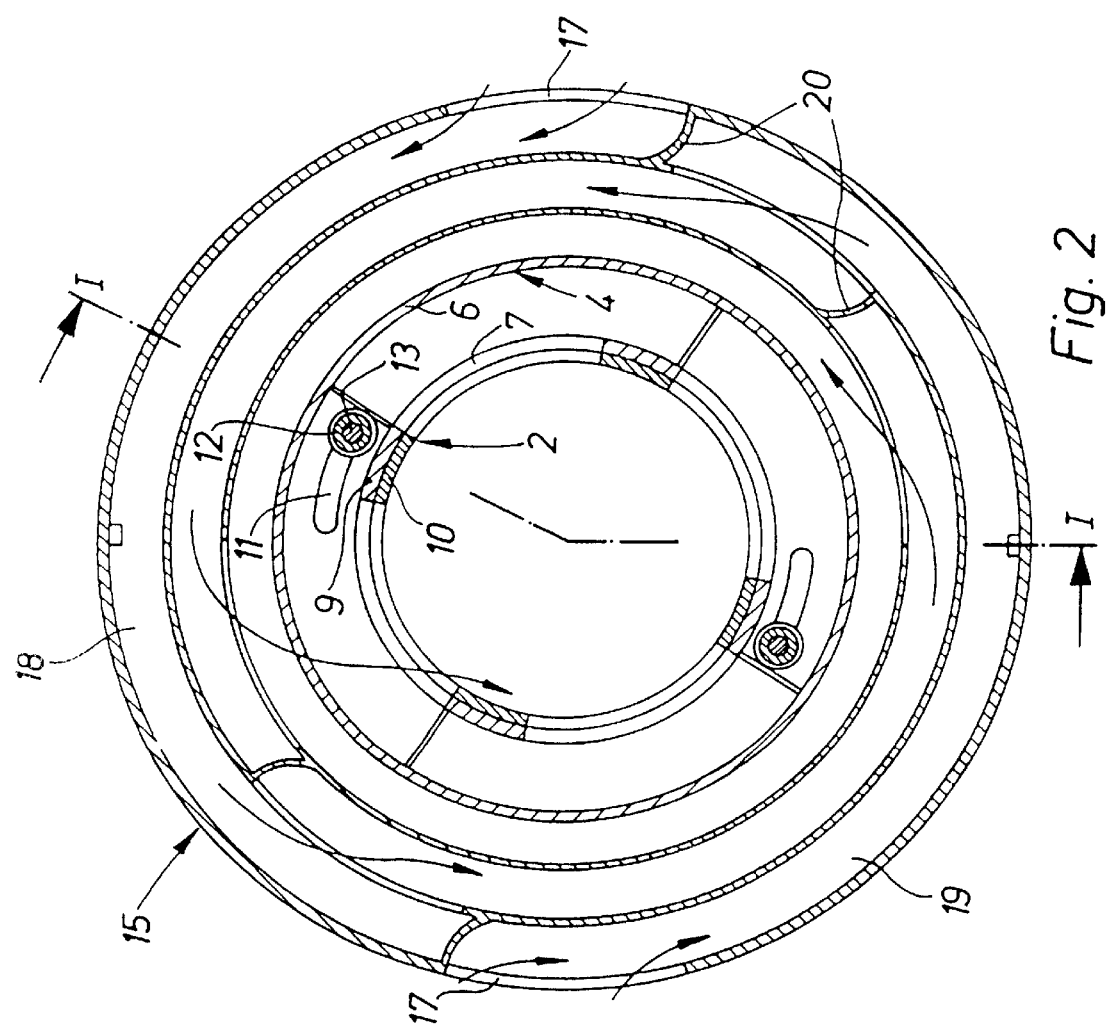

SUCTION PIPE FOR THE COMBUSTION AIR OF A HEATER

FIELD OF THE INVENTION

The present invention pertains to an air intake fitting for the combustion air of a heater, especially of a motor vehicle heater, with a variable flow cross section.

BACKGROUND OF THE INVENTION

The flow cross section is changed in such prior-art air intake fittings by perforated disks arranged in the axial opening, with which the free flow cross section is varied by mutual rotation. In this embodiment, the closed areas of the perforated disks to be mutually rotated may lead to a small maximum flow cross-sectional area. Furthermore, dirt particles may be easily drawn into the heater with the combustion air drawn in in the case of axial flow of the combustion air into the air intake fitting.

SUMMARY AND OBJECTS OF THE INVENTION

In light of this, the present invention deals with the problem of making an air intake fitting of this class functionally better and more efficient. In particular, a filter shall be able to be provided for the air drawn in at the fitting in a structurally simple manner.

According to the invention, an air intake fitting for the combustion air of a heater is provided, especially a motor vehicle heater. The air intake has a variable intake air flow cross section. The air intake fitting is tubular, axially closed and is provided with radial openings. The radial openings have cross sections that can be changed by a ring. The ring is attacked coaxially rotatably radially on the outside and is likewise provided with radial openings.

The present invention is based on the idea that a larger, variable intake flow cross-sectional area can be created on the radial circumference of an air intake fitting than in the axial inlet opening.

By designing the rotatable ring with a U-shaped cross section, a flow deflection of the air to be drawn in can be achieved.

The circumferential position of the ring can be locked in different rotated positions depending on the desired size of the intake flow cross-sectional area. Different intake cross sections are used in the heaters of this type to avoid tolerances in the output of the intake blower. Such tolerances arise due to the fact that the air blowers used in practice operate with different rated speeds of rotation located within a tolerance range due to reasons related to manufacture. To obtain a predetermined amount of air drawn in with an air blower, the intake cross section of the air intake fitting is adapted to the actual rated speed of the blower motor in an installed blower.

The axial closure of the air intake fitting is preferably formed by a rotatable ring.

A hood with a filter, in which flow in the radial direction is possible, may be attached to the ring. Such a hood can be attached especially advantageously if the air intake fitting opens into a conically shaped front wall of the heater, because the space located between the axial end of the fitting and the space located radially outside the fitting before the conical front wall of the heater housing can be utilized without increasing the axial length of the volume of the heater. A filter, through which flow in the radial direction is possible, can be accommodated in a rather advantageous manner in the space located radially outside the air intake fitting before the conical front wall. Such an annular space makes it possible to obtain a relatively large filter area.

The annular space may be utilized, in particular, for filtration according to the centrifugal principle. Thus, the hood attached to the fitting may be equipped with spiral flow channels, through which the air being drawn in is to be guided. A relatively high velocity of flow with spiral direction of flow, in which dirt particles are filtered out of the air being drawn in, can be achieved by narrow cross-sectional shapes of the spiral channels.

Instead of a centrifugal filter, a ring filter through which radial flow is possible may also be easily accommodated.

One particular advantage of the present invention is, e.g., the fact that due to the radial flow of the air being drawn in through the air intake fitting, the heater can be attached to an adjacent component with the front side of the air intake fitting without a special free space for air being drawn in.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a longitudinal section through the air intake-side end of a heater along the section line I—I in FIG. 2, and FIG. 2 is a section through the intake air-side end of a heater along line II—II in FIG. 1.

DESCRIPTION OF THE PREFERRED EMBODIMENT

Referring to the drawings in particular, the invention comprises a heater air intake arrangement at an intake air-side front side of a heater housing 1 with an air intake fitting 2 made in one piece with the heater housing 1. An intake air blower 3, which axially extends into the air intake fitting 2, is located inside the heater housing 1.

A ring 4 with a bottom 5, which is made in one piece with it and closes the axial opening of the air intake fitting 2, is rotatably mounted on the air intake fitting 2. The ring 4 has a U-shaped cross section with an outer leg 6 open toward the housing 1 of the heater 1. The closed part of the U shape of the ring 4 is located toward the closing plane of the air intake fitting 2. An annular gap 8, through which intake air can enter in the direction of the arrows shown in the drawing, is located between the outer leg 6 of the ring 4 and the inner leg 7 of the said ring 4. The inner leg 7 of the ring 4 comprises only a total of four ring sections 9. These ring sections 9 slide, in contact from the outside, on correspondingly associated ring sections 10 of the air intake fitting 2. There is a free space on the circumference between the ring sections 9, 10. A maximum possible free inlet cross section is ensured for combustion air to be drawn in in the mutual association of the ring sections 9, 10 shown in FIG. 2. The free flow cross section can be reduced by rotating the ring 4 in relation to the air intake fitting 2. The angle of rotation of the ring 4 in relation to the air intake fitting 2 is determined by elongated holes 11 in the axial front side of the ring 4. A pin 13, which can be firmly pulled over a cam 12 originating from the front wall of the housing 1, passes through each of the said elongated holes 11. The said pin 13 may be a screw that can be screwed into the cam 12.

The size of the free intake flow areas, which can be set by selecting the mutual position of the ring sections 9 and 10 of the ring and of the air intake fitting, respectively, is determined with respect to a desired amount of intake air according to the actual rated speed of the electric motor 14 driving the blower 3. By selecting different intake cross-sectional areas, it is possible to set equal amounts of intake air for rated speeds of the electric motor 14 which are different due to reasons related to manufacture. The ring is permanently fixed by tightening the pins 13 in the particular rotated position once it is correctly set for a certain rated speed. The intake air inlet area can be changed again by correspondingly rotating the ring 4 only by intentionally loosening this fixation.

A hood 15 can be axially pushed over the housing 1 of the heater via the ring 4 and it can be detachably connected to same via detents.

Two diametrically opposed openings for introducing the intake air are provided radially on the outside on the circumference of the said hood 15. A spiral channel 18, 19 each, extending radially inward, originates from these openings 17. The circumferential length of each of these two spiral channels 18, 19 extends over about 270°. The two spiral channels 18, 19 extend radially one inside the other, and they abruptly pass over from an outer spiral channel diameter to an inner spiral channel diameter. Retaining edges 20 are located in the transition areas. The intake air flows through the spiral channels 18 and 19 at a relatively high velocity, so that dirt particles can be separated within the channels according to the centrifugal principle. The retaining edges 20 contribute to an increase in the separating efficiency by the flow being abruptly deflected at these edges, which leads to an increased discharge of dirt particles.

To remove the water separated from the intake air from the hood 15, the said hood 15 is provided with water drain openings 21.

To separate dirt particles from the intake air, a ring filter, which is made of, e.g., folded filter paper and through which flow in the radial direction is possible, may also be provided in the hood 15, in which case the ring filter replaces the now missing spiral channels 18 and 19.

Due to the conical front side of the heater housing 1 which is given in the exemplary embodiment, the pot-shaped hood 15 can be placed rather advantageously tightly on the conical front wall. This leads to good space utilization, because a ring-shaped free space, which can thus be utilized without increasing the overall length of the heater, is present anyway up to the free end of the air intake fitting 2 due to the conical shape in the axial direction of the heater housing 1. Due to the combustion air being drawn in in the radial direction, the heater can be attached on the air intake-side front side to an adjoining component practically without a gap in the axial direction.

While a specific embodiment of the invention has been shown and described in detail to illustrate the application of the principles of the invention, it will be understood that the invention may be embodied otherwise without departing from such principles.

We claim:

1. A heater combustion air intake fitting, comprising:
   a tubular, axially closed structure provided with radial openings;
   a ring attached coaxially rotatably radially on the outside and provided with radial openings, said ring radial openings and said structure radial openings cooperating to define variable intake air flow cross section means with an opening cross section that can be changed, said ring having a U-shaped cross section with, axially directed legs with a closed U arch located in an area of a closing plane of the air intake fitting.

2. The air intake fitting in accordance with claim 1, further comprising fixing means for fixing a circumferential position of said ring on the air intake fitting.

3. The air intake fitting in accordance with claim 1, wherein said ring forms an axial closure of said intake fitting.

4. A heater combustion air intake fitting, comprising:
   a tubular, axially closed structure provided with radial openings;
   a ring attached coaxially rotatably radially on the outside and provided with radial openings, said ring radial openings and said structure radial openings cooperating to define variable intake air flow cross section means with an opening cross section that can be changed;
   a hood with a filter, said filter having a radial flow through direction, said filter being attachable to said ring.

5. The air intake fitting in accordance with claim 4, wherein said air intake fitting opens into a radially outwardly expanding, conical front wall, and said hood extends openly toward said front wall and is radially completely covered by said front wall with at least one opening located on a circumference of an outer jacket of said hood.

6. Air intake fitting in accordance with claim 4, further comprising a ring filter, through which flow in the radial direction is possible, insertable into said hood.

7. The air intake fitting in accordance with claim 4, wherein said hood is provided with spiral channels carrying intake air.

8. The air intake fitting in accordance with claim 7, wherein said hood has two approximately diametrically opposed intake openings radially on an outside, from which the intake air is guided into the radial openings of the air intake fitting via two said spiral channels located one inside the other.

9. Air intake fitting in accordance with claim 8, wherein each of the said two spiral channels extends over a circumferential angle of at least about 270°.

10. A heater combustion air intake fitting arrangement, comprising:
    a tubular, axially closed structure provided with radial openings;
    a heater housing connected to said tubular structure;
    an intake air blower connected to said housing;
    a ring attached coaxially rotatably radially on an outside of said tubular structure and provided with radial openings, said ring radial openings and said tubular structure radial openings cooperating to define variable intake air flow cross section means with an opening cross section that can be changed, said ring having a U-shaped cross section with, axially directed legs with a closed U arch located in an area of a closing plane of the air intake fitting.

11. The air intake fitting in accordance with claim 10, further comprising fixing means for fixing a circumferential position of said ring on the air intake fitting.

12. The air intake fitting in accordance with claim 10, wherein said ring forms an axial closure of said intake fitting.

13. A heater combustion air intake fitting arrangement, comprising:
    a tubular, axially closed structure provided with radial openings;

a heater housing connected to said tubular structure;

an intake air blower connected to said housing;

a ring attached coaxially rotatably radially on an outside of said tubular structure and provided with radial openings, said ring radial openings and said tubular structure radial openings cooperating to define variable intake air flow cross section means with an opening cross section that can be changed;

a hood with a filter, said filter having a radial flow through direction, said filter being attachable to said ring.

14. The air intake fitting in accordance with claim 13, wherein said air intake fitting opens into a radially outwardly expanding, conical front wall, and said hood extends openly toward said front wall and is radially completely covered by said front wall with at least one opening located on a circumference of an outer jacket of said hood.

15. Air intake fitting in accordance with claim 13, further comprising a ring filter, through which flow in the radial direction is possible, insertable into said hood.

16. The air intake fitting in accordance with claim 13, wherein said hood is provided with spiral channels carrying intake air.

17. The air intake fitting in accordance with claim 16, wherein said hood has two approximately diametrically opposed intake openings radially on an outside, from which the intake air is guided into the radial openings of the air intake fitting via two said spiral channels located one inside the other.

18. Air intake fitting in accordance with claim 17, wherein each of the said two spiral channels extends over a circumferential angle of at least about 270°.

* * * * *